United States Patent
Soeda

(10) Patent No.: US 7,571,653 B2
(45) Date of Patent: Aug. 11, 2009

(54) STRESS MEASURING METHOD AND SYSTEM

(75) Inventor: Takeshi Soeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 5 days.

(21) Appl. No.: 11/507,525

(22) Filed: Aug. 22, 2006

(65) Prior Publication Data

US 2007/0227258 A1    Oct. 4, 2007

(30) Foreign Application Priority Data

Mar. 31, 2006    (JP)    ............................. 2006-096979

(51) Int. Cl.
G01L 1/24    (2006.01)

(52) U.S. Cl. ........................ 73/800; 250/311

(58) Field of Classification Search ................ 73/788, 73/800, 804; 250/306, 307, 310, 311
See application file for complete search history.

(56) References Cited

U.S. PATENT DOCUMENTS

| | | | | |
|---|---|---|---|---|
| 3,800,081 | A * | 3/1974 | Van Oostrum | 348/80 |
| 5,864,393 | A * | 1/1999 | Maris | 356/28 |
| 6,750,451 | B2 * | 6/2004 | Koguchi et al. | 250/311 |
| 6,813,959 | B2 * | 11/2004 | Kim et al. | 73/800 |
| 6,822,234 | B2 * | 11/2004 | Soeda | 250/311 |
| 6,844,551 | B2 * | 1/2005 | Takeno | 250/311 |
| 7,022,988 | B2 * | 4/2006 | Taniguchi et al. | 250/311 |
| 7,084,400 | B2 * | 8/2006 | Soeda | 250/311 |
| 7,342,226 | B2 * | 3/2008 | Soeda | 250/311 |
| 2003/0006373 | A1 * | 1/2003 | Koguchi et al. | 250/311 |
| 2004/0075055 | A1 * | 4/2004 | Soeda | 250/311 |
| 2004/0094714 | A1 * | 5/2004 | Takeno | 250/311 |
| 2005/0061974 | A1 * | 3/2005 | Kim et al. | 250/310 |
| 2005/0082477 | A1 * | 4/2005 | Soeda | 250/311 |
| 2007/0069128 | A1 * | 3/2007 | Soeda | 250/311 |

FOREIGN PATENT DOCUMENTS

| | | |
|---|---|---|
| JP | 4-179215 A | 6/1992 |
| JP | 3285157 A | 5/2002 |
| JP | 2004-327843 A | 11/2004 |

* cited by examiner

*Primary Examiner*—Lisa M Caputo
*Assistant Examiner*—Freddie Kirkland, III
(74) *Attorney, Agent, or Firm*—Westerman, Hattori, Daniels & Adrian, LLP.

(57) ABSTRACT

An energy beam is applied to an evaluation region of a sample, a phase distribution image of the energy beam transmitted to the sample in the evaluation region is obtained, and the obtained phase distribution image is analyzed, whereby a stress distribution in the evaluation region is measured. This measuring method measures a stress, based on a phase distribution image, whereby the stress can be measured irrespectively of a crystalline structure of an evaluation sample. A phase distribution image is used, whereby two-dimensional distribution images of the stress, density and refractive index can be obtained.

18 Claims, 9 Drawing Sheets

PHASE   SMALL  LARGE

STRESS MEASURING METHOD AND SYSTEM

CROSS-REFERENCE TO RELATED APPLICATIONS

This application is based upon and claims the benefit of priority from the prior Japanese Patent Application No. 2006-096979, filed on Mar. 31, 2006, the entire contents of which are incorporated herein by reference.

BACKGROUND OF THE INVENTION

The present invention relates to a stress measuring method and systems, more specifically, a stress measuring method and system for measuring a stress distribution in a microscopic region.

Elements, such as transistors, interconnections, etc., containing the peripheries, are formed of many kinds of polycrystalline substances and amorphous substances. In the vicinity of the interfaces between such substances of a plurality of kinds, various stresses are generated due to different thermal expansion coefficients of the substances, and the structures, and often the performances of the elements are changed. Then, in the fabrication steps and reliability evaluation steps, it is important to evaluate factors which could be stress sources irrespective of the crystallinity differences.

As methods for evaluating stresses of crystalline substances are known methods wherein signal changes due to strains of lattices are metered by X-ray diffraction, electron beam diffraction, Raman spectroscopic analysis using laser, etc. to compute stresses.

On the other hand, as methods which do not rely on the crystallinity of films are known a method wherein stresses are evaluated based on bowing changes of substrates, a method wherein stresses are evaluated based on photoluminescence signal changes given by laser, or other methods. However, the former can evaluate only an average stress of a substrate but cannot evaluate local stresses in electronic device structures, etc. The latter cannot, in the principle, evaluate stresses in submicron-regions, because the converging ability of lasers is about 1 µm.

The related arts are disclosed in, e.g., Reference 1 (Japanese patent No. 3285157), Reference 2 (Japanese published unexamined patent application No. Hei 04-179215), and Reference 3 (Japanese published unexamined patent application No. 2004-327843).

As described above, presently there is no method for evaluating stresses of amorphous substances forming microscopic devices. The stress evaluation of an amorphous substance is made by estimating a stress, based on a stress evaluation result of a crystalline substance neighboring the amorphous substance or by estimating a stress, based on a calculation result given by finite element method. Thus, it is difficult to correctly evaluate stresses in microscopic regions of amorphous substances by the conventional measuring methods. Stress measuring methods which can correctly evaluate stresses in microscopic regions of amorphous substances have been required.

SUMMARY OF THE INVENTION

An object of the present invention is to provide a stress measuring method and system which can evaluate stress applied to a substance and their distribution, and density changes and refractive index changes due to the stress and their distributions, on the submicron level without relying on a crystalline structure of the substance.

According to one aspect of the present invention, there is provided a stress measuring method comprising: applying an energy beam to an evaluation region of a sample and obtaining a phase distribution image of the energy beam transmitted to the sample in the evaluation region; and analyzing the obtained phase distribution image to measure a stress distribution in the evaluation region.

According to another aspect of the present invention, there is provided a stress measuring system comprising: an electron microscope which applies an electron beam to an evaluation region of a sample to obtain a hologram of the electron beam transmitted to the sample; and a processor which converts the hologram to obtain a phase distribution of the electron beam and analyzes the obtained phase distribution image to thereby compute a stress distribution in the evaluation region.

According to the present invention, a phase distribution image of electron beam of an evaluation sample is obtained, and a relationship between phase information and a refractive index, a relationship between a refractive index and a density and a relationship between a density and a stress are referred to the obtained phase distribution image, whereby a stress of a substance which has not been analyzed directly based on a phase distribution image can be measured. A stress is measured based on a phase distribution image, whereby a stress can be measured irrespectively of a crystal structure of the evaluation sample. A phase distribution image is obtained, whereby stress, density and refractive index two-dimensional distribution images can be obtained.

A measuring system using an electron microscope, such as electron beam holography system, etc. is used in obtaining a phase distribution image to thereby obtain phase distribution images of different magnifications, whereby substances of arbitrary sizes of the nanometer-order to the submicron-order can be measured. Accordingly, stresses of the constituent parts of various sizes used in an electronic device, such as the peripheries of a transistor, the peripheries of a multi-level interconnection, etc. can be evaluated.

DETAILED DESCRIPTION OF THE INVENTION

The stress measuring method and system according to one embodiment of the present invention will be explained with reference to FIGS. 1 to 9.

Figure 1:
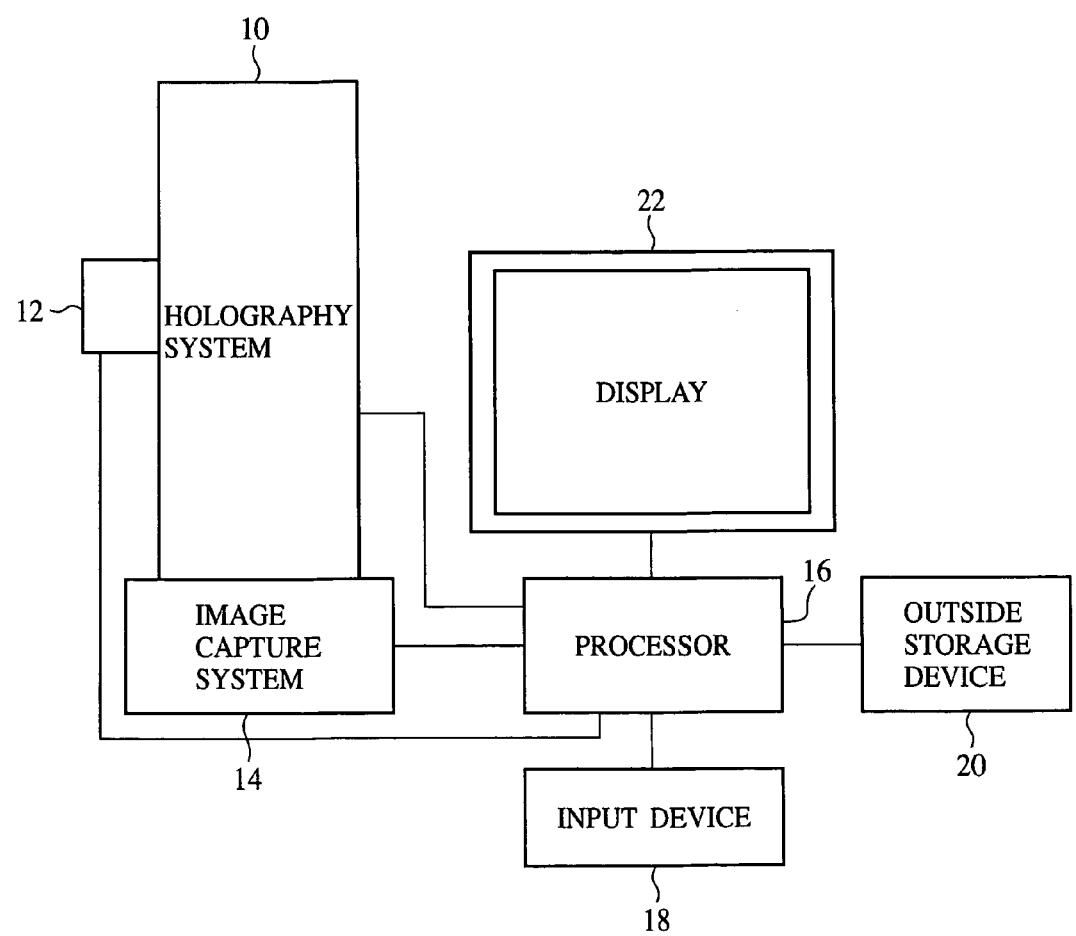
FIG. 1 is a diagrammatic view showing the stress measuring system according to one embodiment of the present invention.
Figure 2:
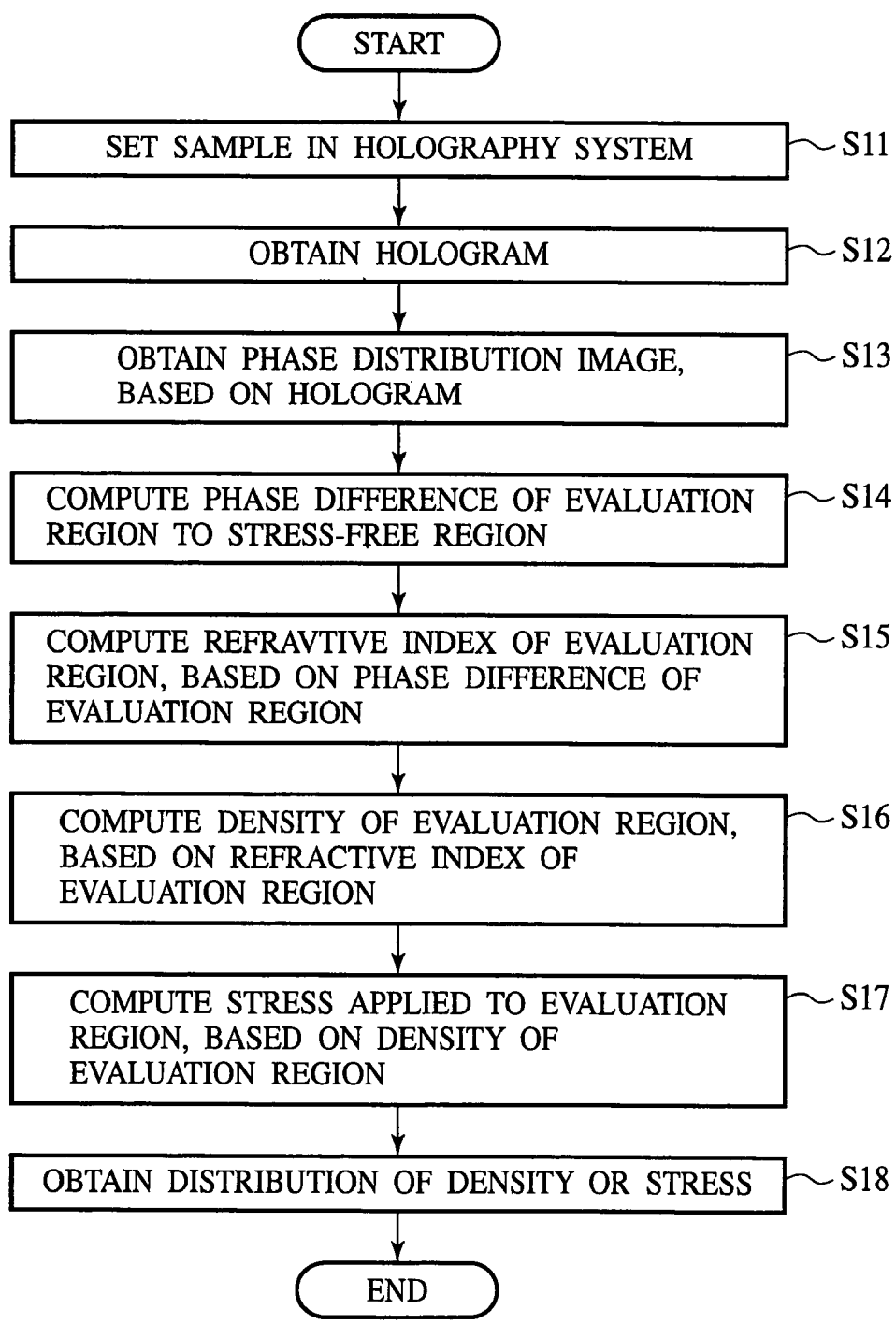
FIG. 2 is a flow chart showing the stress measuring method according to the embodiment of the present invention.
Figure 3:
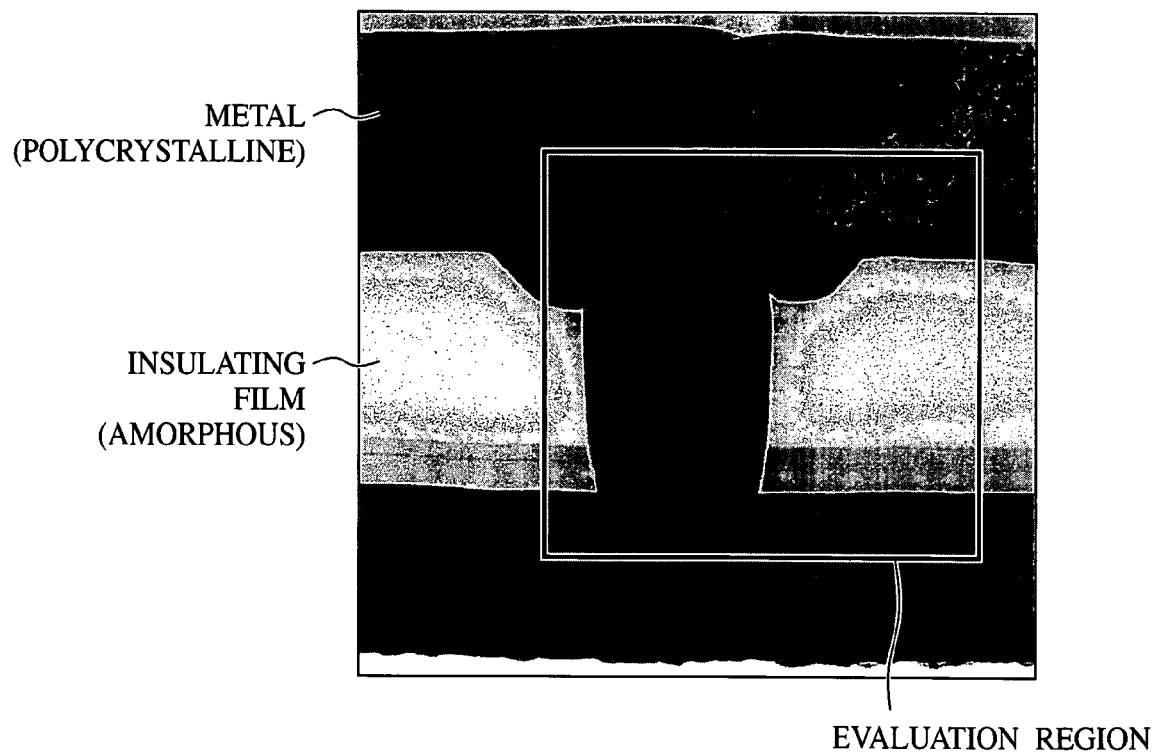
FIG. 3 is an electron microscopic image of an evaluation sample used in the stress measuring method according to the embodiment of the present invention.
Figure 4:
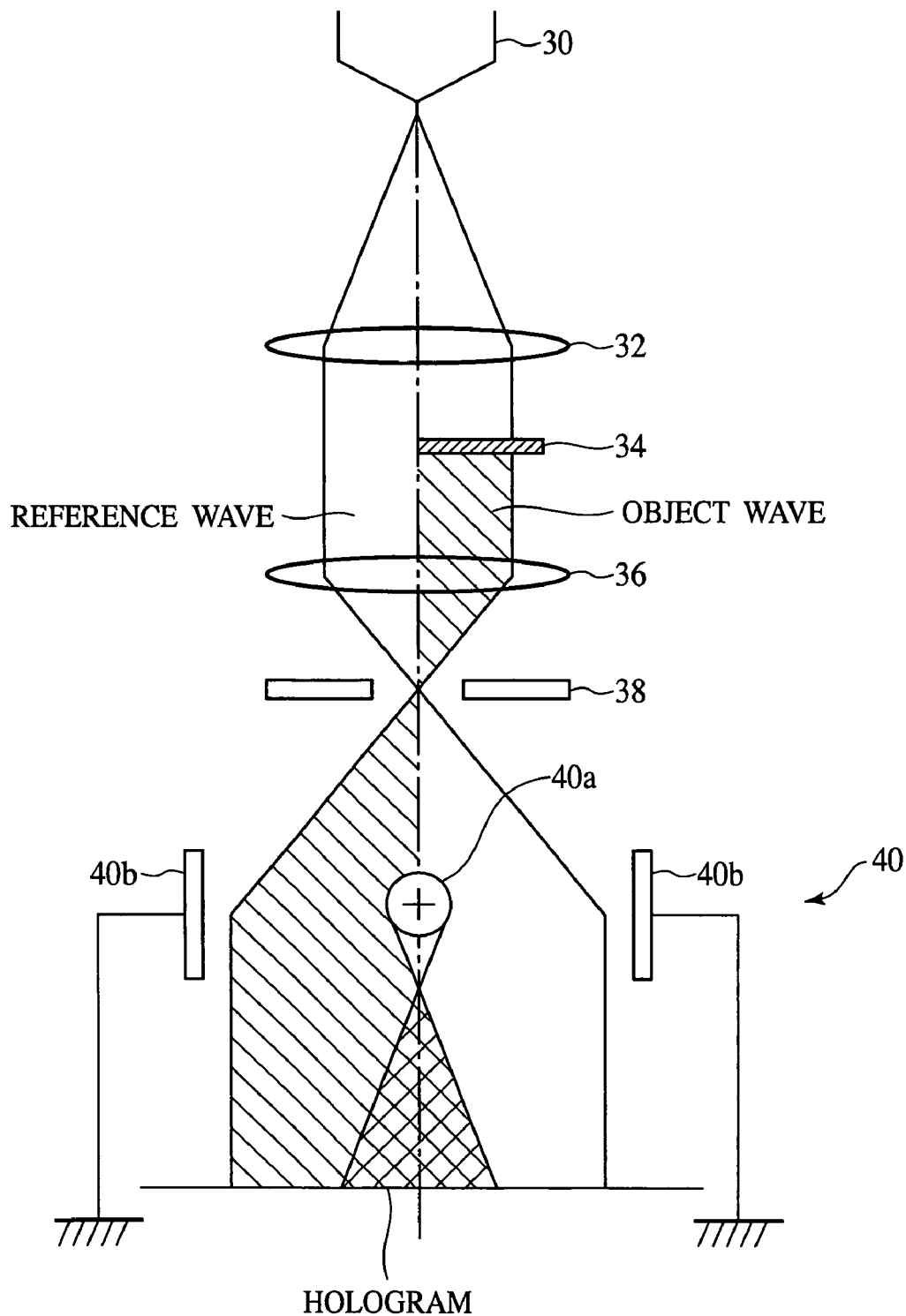
FIG. 4 is a diagrammatic view of the electron beam holography system.
Figure 5A:
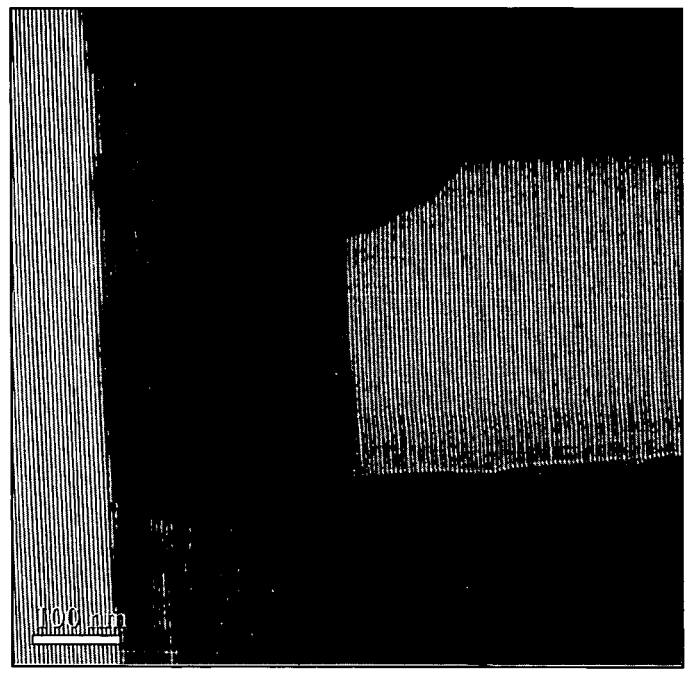
FIG. 5A is an image of one example of a hologram of the evaluation sample.
Figure 5B:
FIG. 5B is an image of one example of a phase distribution image of the evaluation sample.
Figure 5B:
Figure 6:
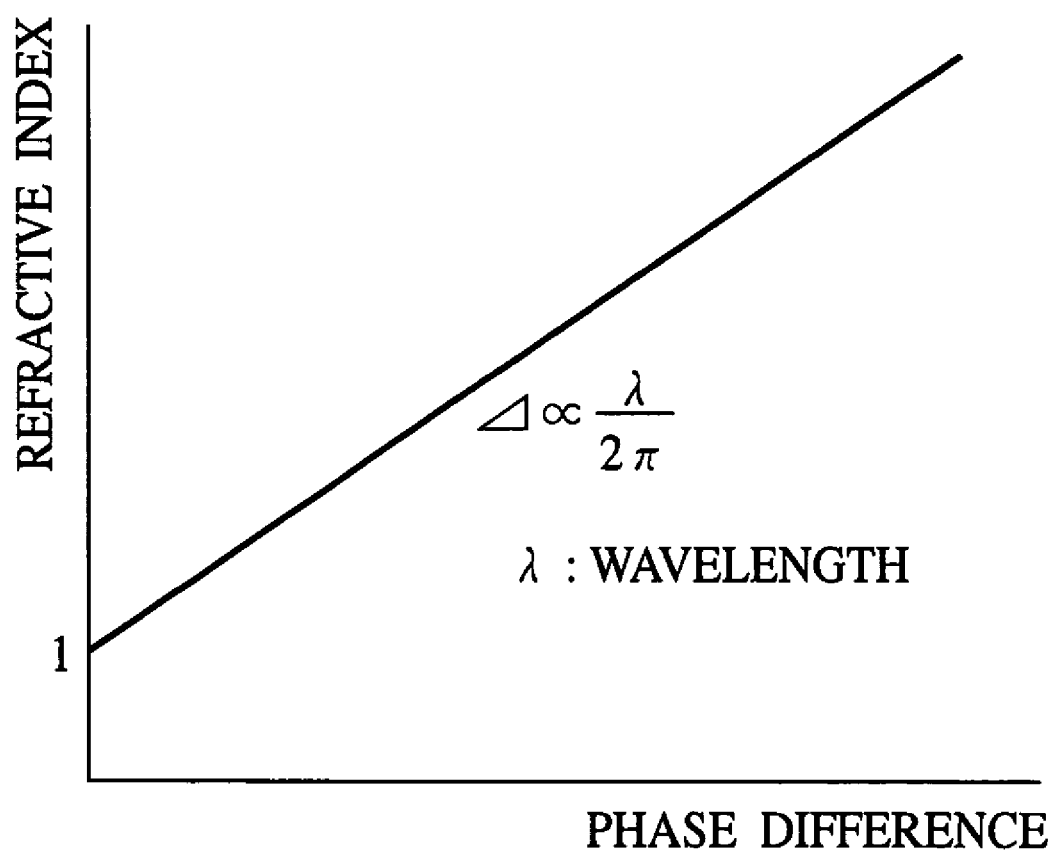
FIG. 6 is a graph showing one example of the relationship between the phase difference and the refractive index.
Figure 7:
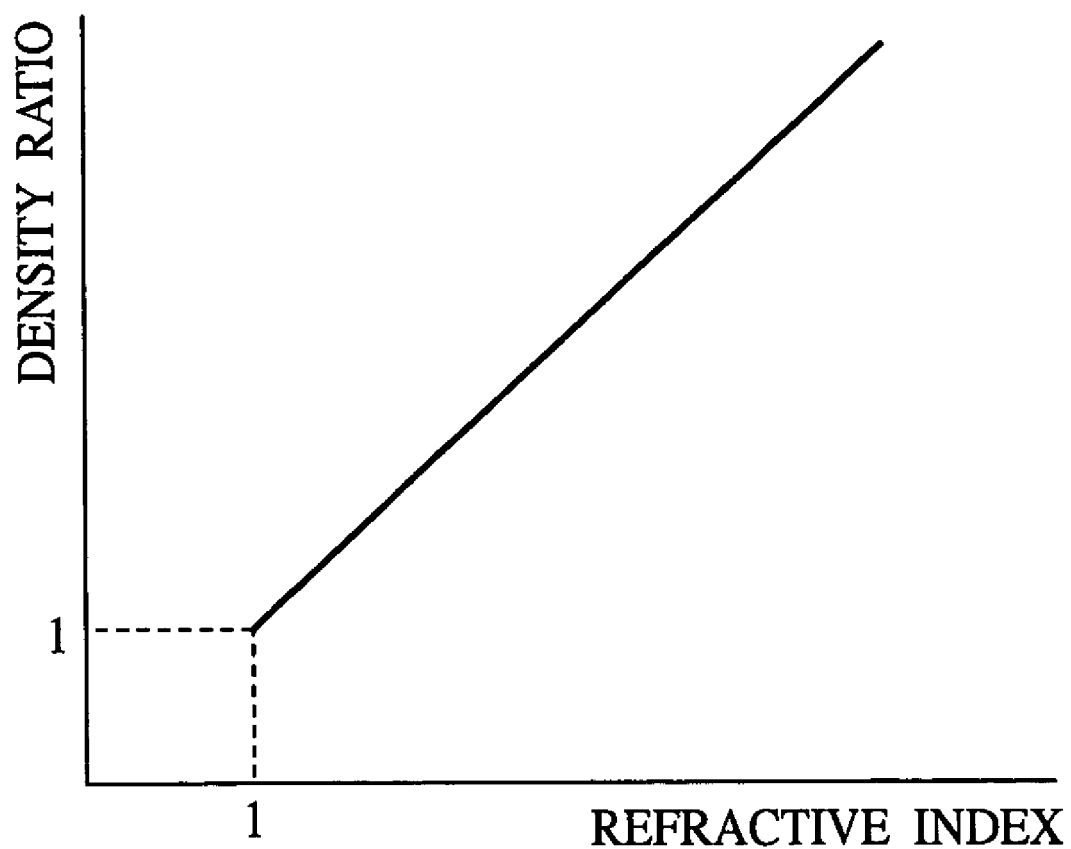
FIG. 7 is a graph showing one example of the relationship between the refractive index and the density.
Figure 8:
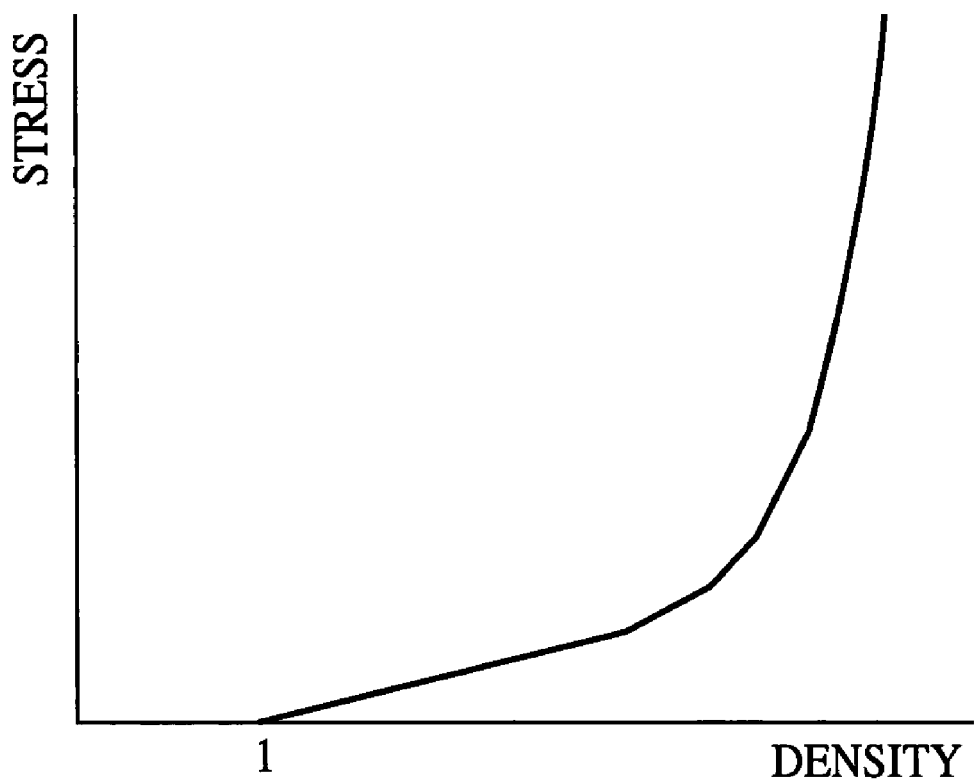
FIG. 8 is a graph showing one example of the relationship between the density and the stress.
Figure 9:
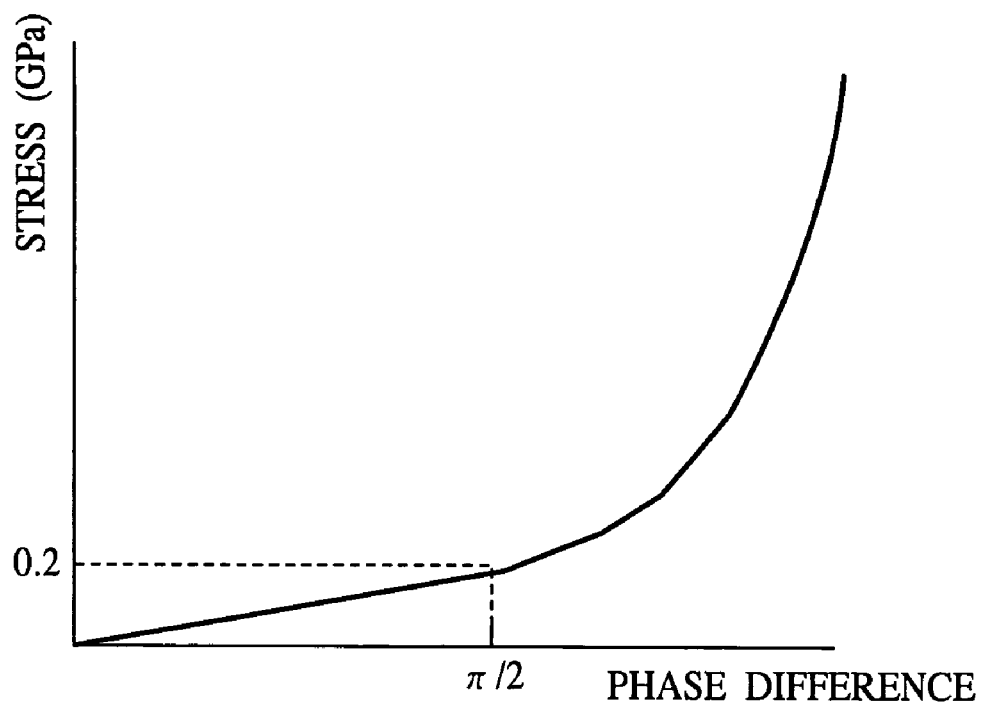
FIG. 9 is a graph showing one example of the relationship between the phase difference and the stress.

FIG. 1 is a block diagram showing the stress measuring system according to the present embodiment. FIG. 2 is a flow chart showing the stress measuring method according to the present embodiment. FIG. 3 is an electron microscopic image of an evaluation sample used in the stress measuring method according to the present embodiment. FIG. 4 is a diagrammatic view of the electron beam holography system. FIG. 5A is a hologram of the evaluation sample. FIG. 5B is a phase distribution image of the evaluation sample. FIG. 6 is a graph showing one example of the relationship between the phase difference and the refractive index. FIG. 7 is a graph showing one example of the relationship between the refractive index and the density. FIG. 8 is a graph showing one example of the relationship between the density and the stress. FIG. 9 is a graph showing one example of the relationship between the phase difference and the stress.

First, the stress measuring system according to the present embodiment will be explained with reference to FIG. 1.

The stress measuring system according to the present embodiment includes a holography system 10 for making a hologram of an evaluation sample. The holography system 10 comprises a sample controller 12 and an image capture system 14 for capturing the hologram made by the holography system 10.

The holography system 10, the sample controller 12 and the image capture system 14 are connected to a processor 16. The processor 16 functions as a controller for controlling the holography system 10, the sample controller 12, etc. and also as an analysis device for analyzing measured data inputted from the image capture system 14.

An input device 18 for inputting information necessary for the measurement, etc., from the outside, an outside storage device 20 for storing databases, etc. to be used in analyzing the measured data, and a display 22 for displaying the analysis results, etc. are connected to the processor 16.

The holography system 10 is not especially limited as far as the system can make hologram, but from the viewpoint of being capable of measuring microscopic region, an electron beam holography system is suitable.

Next, the stress measuring method according to the present embodiment will be explained with reference to FIGS. 2 to 9.

FIG. 2 is a flow chart showing the stress measuring method according to the present embodiment. In this flow chart, a hologram is made (Steps S11-S12), a phase distribution image is made (Step S13), phase difference at an evaluation region is computed based on the phase distribution image (Step S14), a refractive index at the evaluation region is computed based on the phase difference at the evaluation region (Step S15), a density at the evaluation region is computed based on the refractive index at the evaluation region (Step S16), a stress applied to the evaluation region is computed based on the density at the evaluation region (Step S17), and a density or stress distribution is given (Step S18).

First, an evaluation sample is set in the electron beam holography system as the holography system 10 (Step S11). The stress measuring method will be described here by means of the evaluation sample shown in, e.g., FIG. 3. The sample shown in FIG. 3 has the structure that an upper metal interconnection layer is connected to a lower metal interconnection layer through a via-hole formed in an insulating film. The evaluation region of this sample is that of the insulating film formed region, which is near the via-hole.

Next, a hologram of the evaluation sample is made by the holography system 10 (Step S12). The holography system 10 here is an electron beam holography system.

As shown in FIG. 4, the electron beam holography system includes a biprism in the electron microscope with a field emission electron gun mounted on.

The electron beam emitted from the field emission electron gun 30 is formed into parallel beam by a condenser lens 32 to be incident on the evaluation sample 34. The evaluation sample 34 is arranged in advance by the sample controller 12 so that almost a half of the electron beam is incident on the evaluation sample 34. That is, one half of the electron beam (object wave) passes through the evaluation sample 34, and the other half of the electron beam (reference wave) passes through a vacuum region, and these electron beam is incident on an objective lens 36 to be converged and introduced into the biprism 40 through an objective focus 38.

The biprism 40 comprises a thin thread-shaped electrode 40a positioned perpendicularly to the electron beam, and a pair of ground electrodes 40b, which are plate-shaped and parallel with each other, positioned on both sides of the electrode 40a. A positive voltage is applied to the electrode 40a, and the object wave pass through one side of the electrode 40a, and the reference wave pass through the other side of the electrode 40a.

The object wave and the reference wave introduced into the biprism 40 are deflected to be attracted to the electrode 40a, and the two waves are superposed each other to form interference fringes (hologram). The interference fringes contain information of amplitudes and phase changes.

FIG. 5A is a hologram of the evaluation sample 34 made by the electron bema holography system.

The thus made hologram is captured in digital data by the image capture system 14, such as a CCD camera or others, to be supplied to the processor 16.

Then, the thus made hologram is converted to a phase distribution image by the processor 16 (Step S13). The phase distribution image is a two-dimensional phase changes. The phase distribution image can be given by Fourier transforming or Fourier inversely transforming the digital data of the hologram. The method for transforming a hologram to a phase distribution image is detailed in, e.g., "Analytical electron microscopy for material evaluation", Daisuke Shindou and Tetsuo Oikawa, Kyoritsu Shuppan Co., Ltd, pp. 143-145.

FIG. 5B is a phase distribution image transformed from the hologram.

Then, based on the phase distribution image transformed from the hologram, a phase difference to the stress-free region of the evaluation region are computed (Step S14).

The phase distribution image transformed from the hologram shows relative phase changes. Then, a reference point which is necessary for the absolute evaluation of the phase difference is set in the phase distribution image. Methods for setting the reference point are, e.g., 1) the method of setting a phase of the stress-free region to be the reference point, 2) the method of setting a phase of an arbitrary region given by a theoretical computation using finite element method or others to be the reference point, and other methods.

In FIG. 5B here, the point "b" is set to be the reference point for the stress-free region, and a phase difference of the point "a" from the point "b" is computed.

Then, based on a computed phase difference of the evaluation region, a refractive index of the evaluation region is computed (Step S15). The refractive index is computed based on the phase difference by referring to the database showing the relationship between the phase difference and the refractive index, which is stored in the outside storage device 20. The database may be a computation formula using Huyens' principle of the refraction of light, or may be based on an actual sample having the refractive index varied with the density varied.

FIG. 6 is a graph showing one example of the relationship between the phase difference and the refractive index at the time of applying a compressive stress to the evaluation region. In FIG. 6, the refractive index on the vertical axis is a relative ratio to a refractive index at the reference point. As shown in FIG. 6, the phase difference and the refractive index have the fixed relationship that the inclination of the line is proportional to $\lambda/2\pi$ where a wavelength of the electron beam is $\lambda$. Accordingly, this information is stored as a database in the outside storage device 20, and the refractive index for an arbitrary phase difference can be computed.

The refractive index computed here is a relative ratio to a refractive index at the reference point. However, when an absolute value of a refractive index at the reference point is known, the graph of FIG. 6 can be replaced by a correlation graph of the absolute value of the refractive index.

Then, based on the computed refractive index of the evaluation region, a density of the evaluation region is computed (Step S16). The computation of the density based on the refractive index is made by referring to the database showing the relationship between the refractive index and the density, which is stored in the outside storage device 20. The refractive index indicates a quantity of resistance to the propagation of light in a substance. Accordingly, changes of the refractive index of the same material mean density changes.

FIG. 7 is a graph showing one example of the relationship between the refractive index and the density at the time of application of a compressive stress to the evaluation region. In FIG. 7, the refractive index and the density indicate relative ratios to a refractive index and density at the reference point. As shown in FIG. 7, the refractive index and the density have the fixed proportional relationship. Accordingly, this information is stored as a database in the outside storage device 20, and a density to an arbitrary refractive index can be computed.

The density computed here is a relative ratio to a density at the reference point. However, when an absolute value of a density at the reference point is known, the graph of FIG. 7 can be replaced by a correlation graph of the absolute value of the density.

Then, based on the computed density of the evaluation region, a stress applied to the evaluation region is computed (Step S17). The computation of the stress based on the density is made by referring to a database showing the relationship between the density and the stress, which is stored in the outside storage device 20. The database can be prepared by, e.g., 1) the method of applying stress to a theoretical model of the same structure of the evaluation sample to deform the theoretical model and giving relationship between the density and the stress, based on the computation result by using a theoretical computation, such as finite element method or others, to give relationship between the density and the stress, and 2) the method of applying stresses to an actual sample to actually measure density changes.

FIG. 8 is a graph showing one example of the relationship between the density and the stress at the time of applying a compressive stress to the evaluation region. In FIG. 8, the stress and the density are indicated by relative ratio to a stress and a density at the reference point. As shown in FIG. 8, the density and the stress have the fixed relationship depending on a constituent material, a structure, etc. This information is stored in the outside storage device 20 as a database, whereby a stress corresponding to an arbitrary density can be computed. To compute the stress, a database of the relationship between the refractive index and the stress is prepared, and a stress may be given, based on the refractive index.

The stress computed here is a relative ratio to the stress at the reference point. When the absolute value of a stress at the reference point is known, the graph of FIG. 8 can be replaced by a graph of the correlation in the absolute value of the stress.

As described above, the phase difference and the refractive index, the refractive index and the density, and the density and the stress have fixed relationships. Based on the relationships once made in databases, a stress can be given immediately based on a phase difference.

FIG. 9 is a graph of one example of the relationship between the phase difference and the stress at the time of applying compressive stresses to the evaluation region. As shown in FIG. 9, the phase difference and the stress have the fixed relationship depending on a constituent material, a structure, etc. This information is stored as a database in the outside storage device 20, whereby a stress corresponding to an arbitrary phase difference can be immediately computed.

For example, in FIG. 5B, when a phase difference at the point "b" is, e.g., $\pi/2$, the stress value at the point "b" can be computed to be, e.g., 0.2 GPa, based on the graph of FIG. 9.

Then, based on the thus-computed relationship between the phase difference and the stress, a scale of a phase difference in a phase distribution image is converted to a stress scale. Otherwise, based on the thus-computed relationship between the phase difference and the density, a scale of a phase difference in the phase distribution image is converted to a density scale. The phase distribution image is rewritten into a stress distribution image or a density distribution image (Step S18).

Thus, stress values, a stress distribution, densities, a density distribution, refractive indexes, and a refractive index distribution in the evaluation region of an evaluation sample can be measured.

The stress measuring method according to the present embodiment, which computes a stress value based on a phase distribution image is useful especially to measure amorphous substances to which measuring methods using properties of lattices, such as X-ray diffraction, electron beam diffraction, Raman spectroscopy, etc., are not applicable. Furthermore, the stress measuring method according to the present embodiment is applicable not only to amorphous substances, but also to single crystalline substance and polycrystalline substances.

In measuring a single crystalline substance, when electron beam is diffracted, the stress measurement of the present embodiment is impossible. Then, in measuring single crystalline substances, it is preferable to tilt an evaluation sample so that the electron beam is applied in random directions of the lattice. To measure substances of high reflectivity, such as metals or others, the wavelength (acceleration energy) of the electron beam is changed to make the measurement in a wavelength range where the reflection is little.

As described above, according to the present embodiment, a phase distribution image of the electron beam of the evaluation sample is obtained, and the obtained phase distribution image is refereed to relationship between the phase information and the refractive index, relationship between the refractive index and the density, and relationship between the density and the stress, whereby the stress of the substance which cannot be analyzed directly based on the phase distribution image can be measured. Based on the phase distribution image, a two-dimensional distribution image of the stress, the density and the refractive index can be obtained.

A measuring system using an electronic microscope, such as an electron beam holography system or others, is used in obtaining phase distribution image, whereby the phase distribution image of different magnifications can be obtained. Substances of arbitrary sizes of the nanometer-order to the submicron-order can be measured. Accordingly, the nanometer-evaluation can be made on constituent parts of various sizes used in electronic devices, such the peripheries of the transistors and the peripheries of the multi-level interconnection layers, etc.

The stress information of the microscopic regions obtained by the stress measuring method according to the present embodiment is very useful in the processes of fabricating and developing electronic devices. The stress measuring method is incorporated in the process of fabricating, e.g., electronic devices to monitor stresses for the production control, whereby device structures having stresses controlled can be realized.

The stress information of microscopic regions obtained by the stress measuring method according to the present embodiment is very useful also in the process of evaluating the reliability of electronic devices. For example, in the stress migration test of interconnections, the durability of the interconnections mixedly having amorphous substances and crystalline substances is evaluated by thermal stresses. Presently, the evaluation period of time is as long as 1 week to 1 month. In such case, the stress measuring method according to the present embodiment can immediately evaluate stresses generated in the interfaces, e.g., between crystalline substances (interconnections) and amorphous substances (insulating films). The stress measuring method according to the present embodiment practiced in heated environments can provide the temperature dependency of the thermal stresses in a short period of time.

MODIFIED EMBODIMENTS

The present invention is not limited to the above-described embodiment and can cover other various modifications.

For example, in the above-described embodiment, holography is used to obtain the phase distribution image. However, the phase distribution image may be obtained by other methods. The method of obtaining phase information without using the biprism is described in, e.g., Reference 1.

In using holography to obtain the phase distribution image, not only the electron beam holography, but also the holography using other energy beams, e.g., atomic beam holography, X-ray holography may be used.

What is claimed is:

1. A stress measuring method comprising:
applying an energy beam to an evaluation region of a sample and obtaining a phase distribution image of the energy beam transmitted to the sample in the evaluation region which represents a distribution of a phase difference between the energy beam transmitted to the sample in the evaluation region and an energy beam transmitted to a vacuum space; and
analyzing the obtained phase distribution image to measure a stress distribution in the evaluation region.

2. A stress measuring method according to claim 1, wherein
a database showing a relationship between a phase of the energy beam transmitted to the sample, and a stress applied to the sample is prepared; and
the stress distribution in the evaluation region is computed based on the phase distribution image of the evaluation region by referring to the database.

3. A stress measuring method according to claim 2, wherein
the database is prepared by relating a relationship between the phase of the energy beam transmitted to the sample and a refractive index of the sample, a relationship between the refractive index of the sample and a density of the sample, a relationship between the density of the sample and the stress applied to the sample with one another to thereby prepare the database.

4. A stress measuring method according to claim 1, wherein
a phase of the energy beam in a region of the evaluation region, which is free from stress, is set to a reference value; and
an absolute value of a stress in an arbitrary region is computed based on a phase difference between the reference value and a phase of the energy beam in the arbitrary region.

5. A stress measuring method according to claim 1, wherein
a stress value of an arbitrary region of the evaluation region is computed by a theoretical computation;
a phase of the energy beam in the arbitrary region is set to a reference value; and
an absolute value of a stress in another arbitrary region is computed, based on a phase difference between the reference value and a phase of the energy beam in said another arbitrary region.

6. A stress measuring method according to claim 1, wherein
a refractive index distribution of the sample in the evaluation region is measured based on the phase distribution image.

7. A stress measuring method according to claim 6, wherein
a database showing a relationship between a phase of the energy beam transmitted to the sample and the refractive index of the sample is prepared; and
the refractive index distribution is computed based on the phase distribution image by referring to the database.

8. A stress measuring method according to claim 6, wherein
a phase of the energy beam in a region of the evaluation region, which is free from stress, is set to a reference value; and
an absolute value of a refractive index in an arbitrary region is computed based on a phase difference between the reference value and a phase of the energy beam in the arbitrary region.

9. A stress measuring method according to claim 6, wherein
a refractive index in an arbitrary region of the evaluation region is computed by a theoretical computation;
a phase of the energy beam in the arbitrary region is set to a reference value; and
an absolute value of a refractive index in another arbitrary region is computed, based on a phase difference between the reference value and a phase of the energy beam in said another arbitrary region.

10. A stress measuring method according to claim 1, wherein
a density distribution of the sample in the evaluation region is measured based on the phase distribution image.

11. A stress measuring method according to claim 10, wherein
- a database showing a relationship between a phase of the energy beam transmitted to the sample, and a density of the sample is prepared; and
- the density distribution in the evaluation region is computed based on the phase distribution image of the evaluation region by referring to the database.

12. A stress measuring method according to claim 11, wherein
- the database is prepared by relating a relationship between the phase of the energy beam transmitted to the sample and a refractive index of the sample, and a relationship between the refractive index of the sample and the density of the sample with each other to thereby prepare the database.

13. A stress measuring method according to claim 10, wherein
- a phase of the energy beam in a region of the evaluation region, which is free from stress, is set to a reference value; and
- an absolute value of a density of the sample in an arbitrary region is computed based on a phase difference between the reference value and a phase of the energy beam in the arbitrary region.

14. A stress measuring method according to claim 10, wherein
- a density of the sample in an arbitrary region of the evaluation region is computed by a theoretical computation;
- a phase of the energy beam in the arbitrary region is set to a reference value; and
- an absolute value of a density of the sample in another arbitrary region is computed, based on a phase difference between the reference value and a phase of the energy beam in said another arbitrary region.

15. A stress measuring method according to claim 1, wherein
- the phase distribution image is obtained by converting a hologram of the energy beam given by the sample.

16. A stress measuring method according to claim 1, wherein
- the energy beam is an electron beam.

17. A stress measuring method according to claim 1, wherein
- the phase distribution image has interference fringes.

18. A stress measuring system comprising:
- an electron microscope which applies an electron beam to an evaluation region of a sample to obtain a hologram of the electron beam transmitted to the sample; and
- a processor which converts the hologram to obtain a phase distribution image of the electron beam which represents a distribution of a phase difference between the energy beam transmitted to the sample in the evaluation region and an energy beam transmitted to a vacuum space and analyzes the obtained phase distribution image to thereby compute a stress distribution in the evaluation region.

* * * * *